US009855688B2

(12) United States Patent
Ahn et al.

(10) Patent No.: US 9,855,688 B2
(45) Date of Patent: Jan. 2, 2018

(54) THERMOPLASTIC POLYURETHANE COMPOSITION FOR INJECTION MOLDING AND METHOD OF MANUFACTURING THE SAME

(71) Applicants: Hyundai Motor Company, Seoul (KR); Kia Motors Corporation, Seoul (KR); Dongsung Corporation, Busan (KR); Hyundai Mobis Co., Ltd., Seoul (KR)

(72) Inventors: Gye Young Ahn, Seoul (KR); Dae Young Kwon, Ulsan (KR); Hyeon Don Kim, Yongin-si (KR); Chang Wan Son, Yongin-si (KR); Hea Yeon Lee, Seoul (KR)

(73) Assignees: Hyundai Motor Company, Seoul (KR); Kia Motor Corporation, Seoul (KR); Dongsung Corporation, Busan (KR); Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/973,156

(22) Filed: Dec. 17, 2015

(65) Prior Publication Data
US 2017/0029554 A1 Feb. 2, 2017

(30) Foreign Application Priority Data
Jul. 27, 2015 (KR) ........................ 10-2015-0106080

(51) Int. Cl.
| | | |
|---|---|---|
| *C08G 18/61* | (2006.01) | |
| *B29K 675/00* | (2006.01) | |
| *B29C 45/00* | (2006.01) | |
| *C08G 18/32* | (2006.01) | |
| *C08G 18/42* | (2006.01) | |
| *C08G 18/76* | (2006.01) | |
| *C08K 3/00* | (2006.01) | |
| *C08K 5/00* | (2006.01) | |
| *B29K 75/00* | (2006.01) | |

(52) U.S. Cl.
CPC ...... *B29C 45/0001* (2013.01); *C08G 18/3206* (2013.01); *C08G 18/4247* (2013.01); *C08G 18/61* (2013.01); *C08G 18/7671* (2013.01); *C08K 3/0033* (2013.01); *C08K 5/005* (2013.01); *C08K 5/0041* (2013.01); *B29K 2075/00* (2013.01); *C08G 2120/00* (2013.01)

(58) Field of Classification Search
CPC ............... C08G 18/61; C08G 18/4244; C08G 18/4247; C08G 18/425; C08G 18/4252; C08G 18/4257; C08G 18/4258
See application file for complete search history.

(56) References Cited

U.S. PATENT DOCUMENTS

| | | | |
|---|---|---|---|
| 4,379,100 A * | 4/1983 | Salisbury ................ B29C 33/64 | 264/300 |
| 4,769,204 A * | 9/1988 | Oba ....................... C08G 18/08 | 264/300 |
| 5,541,277 A * | 7/1996 | Muhlfeld ............... C08G 18/61 | 150/154 |
| 5,750,580 A | 5/1998 | Mayer et al. | |
| 5,959,034 A * | 9/1999 | Ogawa .................... C08G 18/61 | 525/104 |
| 6,887,911 B2 | 5/2005 | Shidaker et al. | |
| 2002/0099162 A1* | 7/2002 | Iwanaga ............... C08G 18/664 | 528/75 |
| 2004/0116646 A1* | 6/2004 | Choi .................. C08G 18/0895 | 528/66 |

FOREIGN PATENT DOCUMENTS

| | | |
|---|---|---|
| JP | 2011-208059 A | 10/2011 |
| JP | 2013-540182 A | 10/2013 |
| JP | 10-1398113 B1 | 5/2014 |
| KR | 10-0351742 B1 | 8/2002 |
| KR | 10-2005-0017479 A | 2/2005 |
| KR | 10-0493231 A | 5/2005 |
| KR | 10-2007-0094501 A | 9/2007 |
| KR | 10-1351658 B1 | 1/2014 |
| KR | 10-2015-0081438 A | 7/2015 |

* cited by examiner

*Primary Examiner* — Marc Zimmer
(74) *Attorney, Agent, or Firm* — Morgan, Lewis & Bockius LLP

(57) ABSTRACT

The present invention provides a thermoplastic polyurethane composition for injection molding and a method of manufacturing the same. The thermoplastic polyurethane composition for injection molding can be easily injection-molded since a slip property is imparted to a soft segment, and can possess excellent durability properties such as heat-aging resistance, photoaging resistance, and wear resistance, and stability properties such as airbag deployment performance and anti-fogging property, as well as excellent tactile sensation and embossing quality, when a chain extender and a multifunctional polydimethylsiloxane-based compound are mixed with an isocyanate- and ether-containing polyester polyol, and can be useful in simplifying processes, reducing manufacturing costs, and simplifying facilities due to a decrease in the number of parts when molded articles are manufactured using the composition.

12 Claims, No Drawings

THERMOPLASTIC POLYURETHANE COMPOSITION FOR INJECTION MOLDING AND METHOD OF MANUFACTURING THE SAME

CROSS-REFERENCE TO RELATED APPLICATION

This application claims priority under 35 U.S.C. 119(a) to Korean Patent Application No. 10-2015-0106080 filed on Jul. 27, 2015, the entire contents of which are incorporated herein by reference.

BACKGROUND

Technical Field

The present invention relates to a thermoplastic polyurethane composition for injection molding and a method of manufacturing the same. More particularly, the present invention relates to a thermoplastic polyurethane composition for injection molding, which is capable of being easily injection-molded since a slip property is imparted to a soft segment, and possessing excellent durability properties such as heat-aging resistance, photoaging resistance, and wear resistance, and stability properties such as airbag deployment performance and anti-fogging property, as well as excellent tactile sensation and embossing quality, when a chain extender and a multifunctional polydimethylsiloxane-based compound are mixed with an isocyanate- and ether-containing polyester polyol, and can be useful in simplifying processes, reducing manufacturing costs, and simplifying facilities due to a decrease in the number of parts when molded articles are manufactured using the composition, and a method of manufacturing the same.

Background Art

A method of processing a soft type of a skin material for crash pad panels of interior parts of a vehicle includes techniques such as vacuum molding, powder slush molding (PSM), reaction injection molding (RIM), laminate insert molding (LIM), leather wrapping, etc. Here, the skin material for panels refers to a soft pad type of a skin material, and is located on a core material and a pad material.

However, the above-described processing methods use a very restricted material to be applied, and have the following problems in terms of techniques. Specifically, the vacuum molding technique has a problem in that it has limited design flexibility, and it is difficult to realize fancy embossed features.

The PSM technique has problems in that manufacturing costs are high due to a complicated process of preparing a material, and the initial investment costs required to construct facilities are high. Products produced by the PSM technique advantageously have high design flexibility, but have problems in that it is impossible to completely remove tiny pinholes formed on a surface thereof due to their molding properties due to the presence of slush, and there are a relatively large number of redundant skirts. In addition, it has a drawback in that the energy cost is high due to a relatively long cycle time and high process temperature. In addition, thermoplastic polyurethanes (TPUs) prepared by typical polymerization methods other than water dispersion polymerization for application to PSM techniques have a drawback in that an increase in cost of raw materials may be caused since a process of freeze-pulverizing TPU to prepare a powder is further used.

The RIM technique has an advantage in that lightweight, thin and flexible products may be easily painted and molded, but has drawbacks in that a cycle time is long, and raw materials are expensive, compared to an injection technique.

As the first technique developed by Visteon Corporation (US), the LIM technique is an integrated molding technique which includes vacuum-molding a sheet on which a skin material/foam layer is laminated to prepare a skin material, inserting the skin material in a C/pad injection mold, and resin-injecting the skin material to prepare a crash pad. A PP foam layer has a drawback in that emotional qualities may be degraded due to compression by an injection pressure.

The leather wrapping advantageously imparts a refined appearance to interior parts, but has a drawback in that labor costs are high.

As such, a technique of processing a soft type of a skin material using the above-described processing methods has problems in that types of materials applicable thereto are highly restricted, and it is very difficult for materials of the same type to retain good aesthetics, have excellent durability under high-temperature and UV-radiation environments, satisfy deployment performance of airbags, and simultaneously meet both emotional qualities and comfort properties (low VOCs).

In addition, although there are materials which satisfy all physical properties, long-term durability, reliability performance, and emotional qualities, all of which are required for soft types of skin materials for crash pad instrument panels, a very limited number of the materials may be injected into skin materials for instrument panels (IPs) as thin films (1 mm), with no gas flow marks and weld lines formed on an appearance thereof, without performing a molding process. Here, since the IP skin materials themselves are thin, relatively large in size, and have regions which are difficult to design, such as curved regions, etc., typical thermoplastic resin materials may suffer from appearance-related problems in that short molding, gas flow marks, weld lines, and sink marks may be formed on surfaces of the IP skin materials when these resin materials are injection molded.

Korean Registered Patent No. 0351742 discloses a molded article including a thermoplastic polyurethane composed of ether-containing polyester polyols. However, a molded article formed of the skin material for instrument panels prepared by the PSM technique has drawbacks in that a process of preparing a skin material is complicated, manufacturing costs are high, and initial investment costs required to construct facilities are high.

In addition, Korean Registered Patent No. 0493231 discloses a composition for improving scratch resistance of TPU for instrument panels. However, external migration into foam inside or outside the skin material may occur since an additive is not bound to chains via chemical bonds present in a molecular structure of TPU. Therefore, the composition has a drawback in that anti-scratch properties and wear resistance may be degraded over time.

Therefore, there is a demand for development of novel materials which have excellent durability under high-temperature and UV-radiation environments, and are applicable to injection molding while satisfying both emotional qualities and comfort properties.

The above information disclosed in this Background section is only for enhancement of understanding of the background of the invention and therefore it may contain information that does not form the prior art that is already known to a person of ordinary skill in the art.

SUMMARY OF THE DISCLOSURE

The present invention has been made in an effort to solve the above-described problems associated with the prior art.

To solve the above problems, the inventors have found that a thermoplastic polyurethane composition can be easily injection-molded since a slip property is imparted to a soft segment due to the presence of chemical bonds in polyurethane molecules, and can possess excellent molded article qualities such as tactile sensation and embossing quality, durability properties such as heat-aging resistance, photoaging resistance, and wear resistance, and stability properties such as airbag deployment performance and anti-fogging property when a chain extender and a multifunctional polydimethylsiloxane-based compound are mixed with an isocyanate- and ether-containing polyester polyol. Therefore, the present invention has been completed based on these findings.

Therefore, it is an object of the present invention to provide a thermoplastic polyurethane composition for injection molding, which is easily injection-molded, and has improved durability properties and stability properties.

It is another object of the present invention to provide a method of manufacturing a thermoplastic polyurethane composition for injection molding capable of simplifying processes, reducing manufacturing costs, and simplifying facilities.

It is still another object of the present invention to provide a molded article formed of the thermoplastic polyurethane composition for injection molding capable of enhancing fuel efficiency due to manufacture of lightweight vehicles.

Objects of the present invention are not limited to the objects referred to above. Objects of the present invention will be clarified through descriptions below and will be realized by means disclosed in the appended claims and combinations thereof.

In order to achieve the objects, the present invention includes embodiments as follows.

In one aspect, the present invention provides a thermoplastic polyurethane composition for injection molding, which includes from about 15 to about 60 parts by weight of an isocyanate compound, from about 30 to about 70 parts by weight of an ether-containing polyester polyol, from about 5 to about 40 parts by weight of a chain extender, and from about 0.1 to about 5 parts by weight of a multifunctional polydimethylsiloxane-based compound.

In another aspect, the present invention provides a method of manufacturing a thermoplastic polyurethane composition for injection molding, which includes primarily mixing from about 30 to about 70 parts by weight of an ether-containing polyester polyol, from about 5 to about 40 parts by weight of a chain extender, and from about 0.1 to about 5 parts by weight of a multifunctional polydimethylsiloxane-based compound, adding from about 15 to about 60 parts by weight of an isocyanate compound to the mixture obtained in the primary mixing and secondarily mixing the isocyanate compound with the mixture, curing the product obtained in the secondary mixing and pulverizing the product, mixing from about 0.1 to about 5 parts by weight of a photostabilizer with 100 parts by weight of the pulverized product obtained in the pulverizing and extruding the resulting mixture, and mixing from about 0.1 to about 2 parts by weight of a pigment with the blend obtained in the extruding and coloring the resulting mixture.

In still another aspect, the present invention provides a molded article formed of the thermoplastic polyurethane composition for injection molding.

Other aspects and preferred embodiments of the invention are discussed infra.

DETAILED DESCRIPTION

Hereinafter reference will be made in detail to various embodiments of the present invention. While the invention will be described in conjunction with exemplary embodiments, it will be understood that the present description is not intended to limit the invention to the exemplary embodiments. On the contrary, the invention is intended to cover not only the exemplary embodiments, but also various alternatives, modifications, equivalents and other embodiments, which may fall within the spirit and scope of the invention as defined by the appended claims.

In the description of the present invention, certain detailed explanations of the related art are omitted when it is deemed that they may unnecessarily obscure the essence of the invention. Throughout this specification, unless explicitly described otherwise, the expression "including" will be understood to imply the inclusion of stated elements but not the exclusion of any other elements.

The present invention provides a thermoplastic polyurethane composition for injection molding, which includes from about 15 to about 60 parts by weight of an isocyanate compound, from about 30 to about 70 parts by weight of an ether-containing polyester polyol, from about 5 to about 40 parts by weight of a chain extender, and from about 0.1 to about 5 parts by weight of a multifunctional polydimethylsiloxane-based compound.

According to a preferred embodiment of the present invention, the thermoplastic polyurethane composition for injection molding has a melt flow index of from about 200 to about 250 g/10 min (measured at 165° C. and a load of 2.16 kg according to ISO 1133), and may have physical properties, for example, a shear rate of about 8,000 s or more, and a viscosity of about 20 Pa·s or less when a shear stress of about 147,100 Pa is applied at a temperature of about 180° C. In this case, measuring equipment is a capillary rheometer, and the above-mentioned thermal characteristics may be determined using a Shimadzu CFT 500 with a piston area of 1 cm$^2$, a die diameter of 1 mm, and a die depth of 10 mm (LID 1 mm: 10 mm).

According to another preferred embodiment of the present invention, an aromatic isocyanate, an aliphatic isocyanate, or an alicyclic isocyanate may be used as the isocyanate compound. More preferably, at least one selected from the group consisting of diphenylmethane diisocyanate (MDI), toluene diisocyanate (TDI), hexamethylene diisocyanate (HDI), dicyclohexylmethane diisocyanate (H12MDI), and isophorone diisocyanate (IPDI) may be used as the isocyanate compound.

According to still another preferred embodiment of the present invention, the isocyanate compound may have an NCO/OH molar ratio of from about 0.98 to about 0.99. Specifically, when the NCO/OH molar ratio of the isocyanate compound is less than about 0.98, a filling rate may be lowered due to low flowability, and short molds may be created upon injection molding. On the other hand, when the NCO/OH molar ratio of the isocyanate compound is greater than about 0.99, moldability and appearance are good, but tensile strength may be lowered due to high flowability. Preferably, the NCO/OH molar ratio may be in a range of from about 0.98 to about 0.99, more preferably about 0.985.

According to yet another preferred embodiment of the present invention, the isocyanate compound may be included in an amount of from about 15 to about 60 parts by weight. When the content of the isocyanate compound is less than about 15 parts by weight, a hard segment domain region in a molecular structure of thermoplastic polyurethane (TPU) may be narrowed, resulting in a decrease in melting point and degradation of heat resistance. On the other hand, when the content of the isocyanate compound is greater than about 60 parts by weight, the hard segment domain region may be widened, resulting in excessive increase in hardness and degradation of emotional qualities.

According to yet another preferred embodiment of the present invention, the ether-containing polyester polyol that may be used herein may include at least one selected from the group consisting of a multifunctional carboxylic acid compound, a multifunctional alcohol compound, and a poly(tetramethylene ether) glycol (PTMG). Specifically, the ether-containing polyester polyol including from about 40 to about 80 parts by weight of the multifunctional carboxylic acid compound and from about 20 to about 100 parts by weight of the poly(tetramethylene ether) glycol may be used. In addition, the ether-containing polyester polyol including from about 30 to about 70 parts by weight of the multifunctional carboxylic acid compound, from about 10 to about 50 parts by weight of the multifunctional alcohol compound, and from about 20 to about 60 parts by weight of the poly(tetramethylene ether) glycol may be used.

According to yet another preferred embodiment of the present invention, the multifunctional carboxylic acid compound that may be used herein may include at least one selected from the group consisting of adipic acid, suberic acid, abelic acid, azelaic acid, sebacic acid, dodecanedioic acid, and trimeric acid.

According to yet another preferred embodiment of the present invention, the multifunctional alcohol compound that may be used herein may include at least one selected from the group consisting of 1,4-butylene glycol, ethylene glycol, butanediol, hexanediol, and trimethylolpropane.

According to yet another preferred embodiment of the present invention, the poly(tetramethylene ether) glycol (PTMG) may have a hydroxyl value of from about 50 to about 600 mg KOH/g. Specifically, when the hydroxyl value of the poly(tetramethylene ether) glycol is less than about 50 mg KOH/g, the poly(tetramethylene ether) glycol may not be chemically bound in a molecular structure of a polyester polyol to be synthesized due to an excessively high molecular weight. On the other hand, when the hydroxyl value of the poly(tetramethylene ether) glycol is greater than about 600 mg KOH/g, crystallinity of a polyester polyol to be synthesized may be degraded due to an excessively low molecular weight, and heat-aging resistance may be degraded due to a decrease in melting point after preparation of TPU. Preferably, the hydroxyl value may be in a range of from about 56.1 to about 561 mg KOH/g.

According to yet another preferred embodiment of the present invention, the ether-containing polyester polyol may have a hydroxyl value of from about 1 to about 250 mg KOH/g. Specifically, when the hydroxyl value is less than about 1 mg KOH/g, it is difficult to stir a chain extender and an isocyanate upon polymerization of TPU due to an excessively high viscosity, which makes it impossible to synthesize TPU. On the other hand, when the hydroxyl value is greater than about 250 mg KOH/g, characteristics of amorphous polyols may be expressed, and thus heat-aging resistance may be degraded due to a decrease in melting point after preparation of TPU. Preferably, the hydroxyl value may be in a range of from about 11 to about 224 mg KOH/g, e.g., from about 11.22 to about 224.11 mg KOH/g.

According to yet another preferred embodiment of the present invention, the ether-containing polyester polyol may be present in an amount of from about 30 to about 70 parts by weight. When the content of the ether-containing polyester is less than about 30 parts by weight, emotional qualities may be degraded due to lack of soft segments. On the other hand, when the content of the ether-containing polyester is greater than about 70 parts by weight, a melting point of TPU may be lowered due to lack of hard segments, resulting in degraded heat-aging resistance.

According to yet another preferred embodiment of the present invention, the chain extender may be added to extend TPU molecules and simultaneously constitute the hard segments. In this case, the chain extender that may be used herein may include at least one selected from the group consisting of 1,4-butylene glycol, ethylene glycol, diethylene glycol, butanediol, hexanediol, trimethylolpropane, and poly(tetramethylene ether) glycol.

According to yet another preferred embodiment of the present invention, the chain extender may be present in an amount of from about 5 to about 40 parts by weight. When the content of the chain extender is less than about 5 parts by weight, a melting point of TPU may be lowered due to lack of hard segments, resulting in degraded heat-aging resistance. On the other hand, when the content of the chain extender is greater than about 40 parts by weight, emotional qualities of TPU may be degraded due to excess hard segments.

According to yet another preferred embodiment of the present invention, a compound represented by the following Formula 1 may be used as the multifunctional polydimethylsiloxane-based compound:

[Formula 1]

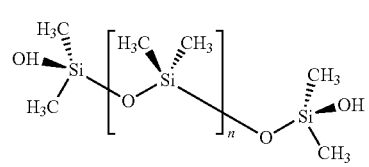

wherein n is an integer ranging from about 4 to about 138.

Specifically, since the multifunctional polydimethylsiloxane-based compound is chemically bound to a molecular chain of TPU upon addition polymerization, wear resistance, scratch resistance in a final product (i.e., surface of the final product) may be improved due to inherent slip characteristics of such a chemical compound, and injection workability (mold releasability) may also be improved during an injection process. A polydimethylsiloxane diol containing two multifunctional hydroxyl groups may be used as such a multifunctional polydimethylsiloxane-based compound. The polydimethylsiloxane diol has a hydroxyl value of from about 18 to about 28, e.g., 18.7 to about 28.1 mg KOH/g. In addition, since the polydimethylsiloxane diol contains the multifunctional hydroxyl groups, the polydimethylsiloxane diol may react with an isocyanate during a polymerization process to chemically bind to a soft segment of TPU, thereby imparting slip properties and securing thermal properties.

Generally, as a partially crystalline resin containing many amorphous regions, a soft TPU has a drawback in that process workability may be degraded due to sticky characteristics upon molding into final molded articles. For this reason, various external and internal lubricants are applicable, but a silicon-based additive is often used. Generally, the silicon-based additive is a polydimethylsiloxane (PDMS)-based additive. Such a polydimethylsiloxane-based additive is effective in improving process workability, and also has an excellent effect of improving wear resistance and scratch resistance of a final molded article. However, when the polydimethylsiloxane-based additive is used, desired improvement of process workability, wear resistance and scratch resistance may be achieved, but it is difficult to maintain uniform distribution in a matrix of TPU under various conditions, and the polydimethylsiloxane-based additive may migrate to a surface of the matrix under certain conditions.

Accordingly, since the polydimethylsiloxane-based additive used in the present invention has hydroxyl groups as functional groups at both ends thereof, the polydimethylsiloxane-based additive may react with an isocyanate in raw materials upon preparation of TPU to have one of molecular structures, which form a TPU matrix, so as to solve the above-listed problems such as external migration. Such a polydimethylsiloxane-based additive may have two functional groups. Specifically, when the polydimethylsiloxane-based additive has one functional group, it may not be added in a series of TPU molecules. On the other hand, when the polydimethylsiloxane-based additive has three or more functional groups, cross-linking may be induced, and thermoplastic characteristics may be hampered, resulting in poor moldability.

According to a preferred embodiment of the present invention, the multifunctional polydimethylsiloxane-based compound may have a hydroxyl value of from about 11 to about 248 mg KOH/g. Specifically, when the hydroxyl value is less than about 11 mg KOH/g, the multifunctional polydimethylsiloxane-based compound has too high a molecular weight to be used as a reactive raw material, and thus may not participate in reaction to form a chemical bond. As a result, the additive may converge on a surface of the compound upon polymerization, and wear resistance may be degraded with lapse of time. On the other hand, when the hydroxyl value is greater than about 248 mg KOH/g, the multifunctional polydimethylsiloxane-based compound may not readily function as a soft segment due to a low molecular weight thereof, and may have a poor effect of improving scratch resistance and wear resistance of a final molded article.

According to another preferred embodiment of the present invention, the multifunctional polydimethylsiloxane-based compound may be used in an amount of from about 0.1 to about 5 parts by weight. When the content of the multifunctional polydimethylsiloxane-based compound is less than about 0.1 parts by weight, desired improvement effects may not be achieved due to content deficiency. On the other hand, when the content of the multifunctional polydimethylsiloxane-based compound is greater than about 5 parts by weight, a melting point of a soft segment may be reduced, resulting in degraded heat-aging resistance.

According to still another preferred embodiment of the present invention, the thermoplastic polyurethane composition for injection molding may have a melt flow index of from about 200 to about 250 g/10 min (at 165° C. and 2.16 kg). Specifically, when the melt flow index is less than about 200 g/10 min, short molding may occur due to insufficient filling of the composition caused by decrease in fluid flow during a film skin injection process. On the other hand, when the melt flow index is greater than about 250 g/10 min, long-term durability and other mechanical properties may be degraded due to a low molecular weight of TPU.

According to yet another preferred embodiment of the present invention, the thermoplastic polyurethane composition for injection molding may further include from about 0.1 to about 5 parts by weight of a photostabilizer, and from about 0.1 to about 2 parts by weight of a pigment, based on 100 parts by weight of the thermoplastic polyurethane composition. Specifically, the photostabilizer may impart photostability to the thermoplastic polyurethane composition to enhance UV resistance. In this case, a UV absorber, HALS, or a mixture thereof may be used as the photostabilizer. In addition, the pigment needs to be added to impart color to a final molded article. In this case, most inorganic and organic pigments, or mixtures thereof may be used as the pigment.

A method of manufacturing a thermoplastic polyurethane composition for injection molding according to one embodiment of the present invention includes primarily mixing from about 30 to about 70 parts by weight of an ether-containing polyester polyol, from about 5 to about 40 parts by weight of a chain extender, and from about 0.1 to about 5 parts by weight of a multifunctional polydimethylsiloxane-based compound, adding from about 15 to about 60 parts by weight of an isocyanate compound to the mixture obtained in the primary mixing and secondarily mixing the isocyanate compound with the mixture, curing the product obtained in the secondary mixing and pulverizing the product, mixing from about 0.1 to about 5 parts by weight of a photostabilizer with about 100 parts by weight of the pulverized product obtained in the pulverizing and extruding the resulting mixture, and mixing from about 0.1 to about 2 parts by weight of a pigment with the blend obtained in the extruding and coloring the resulting mixture.

According to a preferred embodiment of the present invention, the ether-containing polyester polyol is prepared by mixing from about 30 to about 70 parts by weight of a multifunctional carboxylic acid compound, from about 10 to about 50 parts by weight of a multifunctional alcohol compound, and from about 20 to about 60 parts by weight of poly(tetramethylene ether) glycol and heating the resulting mixture from room temperature to about 140 to 160° C. Thereafter, the mixture is maintained at a primary heating temperature of about 150° C. for approximately 60 to 120 minutes, again heated to from about 150 to about 230° C., and maintained at a secondary heating temperature of about 220° C. for approximately 10 to 120 minutes. Then, a vacuum of from about 650 to about 760 mm Hg is applied to the mixture at a secondary maintenance temperature, and a reaction is then terminated when an acid value of the mixture reaches about 1 mg KOH/g or less. In this case, an ether-containing polyester polyol having a hydroxyl value of from about 1 to about 250 mg KOH/g may be prepared. More preferably, an ether-containing polyester polyol having a hydroxyl value of from about 11 to about 224 mg KOH/g, e.g., from about 11.22 to about 224.11 mg KOH/g, may be prepared.

According to another preferred embodiment of the present invention, in the primary mixing, the mixing may be performed while stirring mixed at a temperature of from about 30 to about 100° C. for 1 to 10 minutes so that the polyol compound, the chain extender, and the multifunctional polydimethylsiloxane-based compound are homogeneously mixed.

According to still another preferred embodiment of the present invention, in the secondary mixing, the isocyanate compound may be mixed with the mixture obtained in the primary mixing at a rate of from about 300 to about 1,000 rpm for from about 1 to about 10 minutes to perform polymerization. In the secondary mixing, the isocyanate compound and the ether-containing polyester polyol may be substantially mixed to prepare polyurethane.

According to yet another preferred embodiment of the present invention, in the curing and pulverizing, the curing may be performed at a temperature of from about 60 to about 140° C. for from about 1 to about 48 hours. A product obtained after curing may be pulverized at a temperature of about 0° C. or less.

According to yet another preferred embodiment of the present invention, the extruding and the coloring may be performed at a temperature of from about 150 to about 300° C. In this case, the pulverized product may be molded into a pellet which may be processed into products through such pulverization, extrusion, and coloring processes.

Meanwhile, the present invention provides a molded article formed of the thermoplastic polyurethane composition for injection molding. The molded article may be manufactured through injection molding.

According to a preferred embodiment of the present invention, the molded article may be a skin material for vehicle interior parts. In this case, the skin material may have a thickness of from about 0.1 to about 10 mm, preferably about 1 mm.

Therefore, the thermoplastic polyurethane composition according to one embodiment of the present invention can be easily injection-molded since a slip property is imparted to a soft segment due to the presence of chemical bonds in polyurethane molecules, and can possess excellent molded article qualities such as tactile sensation and embossing quality, durability properties such as heat-aging resistance, photoaging resistance, and wear resistance, and stability properties such as airbag deployment performance and anti-fogging property when a chain extender and a multifunctional polydimethylsiloxane-based compound are mixed with an isocyanate- and ether-containing polyester polyol.

In addition, the molded article formed of the thermoplastic polyurethane composition may have an equivalent level of performance and excellent aesthetics even when the molded article is manufactured by an injection technique, compared to skin materials prepared by conventional techniques. Particularly, the molded article can be useful in simplifying processes, reducing manufacturing costs, and simplifying facilities due to a decrease in the number of parts since a process of preparing a powder is not required when compared to a conventional PSM technique.

Further, since the thermoplastic polyurethane composition is formed into molded articles with a thin and uniform thickness in a molding technique, the thermoplastic polyurethane composition can be useful in contributing to improvement of fuel efficiency due to decrease in weight of the molded articles, and also has cost-saving and waste reduction effects since the least pieces of the molded articles remain.

Hereinafter, one or more embodiments of the present invention will be described in detail with reference to the following examples. However, these examples are not intended to limit the purpose and scope of the one or more embodiments of the present invention.

EXAMPLES

The following examples illustrate the invention and are not intended to limit the same.

Example 1

44 parts by weight (50 kg) of adipic acid, 20 parts by weight (22.8 kg) of 1,4-butylene glycol, and 36 parts by weight (40.9 kg) of a poly(tetramethylene ether) glycol having a hydroxyl value of 448.8 mgKOH/g were mixed, and the resulting mixture was then heated from room temperature to 150° C. and maintained at a primary heating temperature of 150° C. for approximately 60 minutes. Thereafter, the mixture was again heated from 150° C. to 230° C., and then maintained at a secondary heating temperature of 230° C. for approximately 30 minutes. Then, a vacuum of 720 mmHg was applied to the mixture at this secondary heating temperature, and a reaction was then terminated when an acid value of the mixture reached 0.3 mgKOH/g or less. In this case, an ether-containing polyester polyol having a degree of condensation of 12.3% and a hydroxyl value of 74.8 mgKOH/g was prepared.

Next, 66.4 parts by weight (71 kg) of the ether-containing polyester polyol, 8.2 parts by weight (8.8 kg) of 1,4-butylene glycol, and 0.93 parts by weight (1 kg) of a polydimethylsiloxane diol (having a hydroxyl value of 22.44 mgKOH/g) were mixed, and the resulting mixture was primarily mixed at 60° C. for 3 minutes. Thereafter, 22.4 parts by weight (24 kg) of hexamethylene diisocyanate (having an NCO/OH molar ratio of 0.985) was added thereto, and then secondarily mixed at a rate of 500 rpm for 3 minutes to obtain a polymerized product. Then, the polymerized product was cured at 80° C. for 8 hours. Subsequently, the polymerized product was pulverized into the form of chips (flakes) at a temperature of 0° C. or lower. The pulverized product was extruded at 180° C. to be pelletized. In this case, 0.28 parts by weight of an antioxidant, 0.28 parts by weight of an anti-hydrolysis agent, and 1.5 parts by weight of a photo-stabilizer were simply mixed separately, and the resulting mixture was added upon preparation of a TPU base resin for injection molding. Next, the mixture was treated to obtain a pellet having a melt flow index of 210 g/10 min, as measured at 165 s and a load of 2.16 kg according to ISO 1133. The prepared pellet was blended with 0.93 parts by weight (1 kg) of a blackish pigment, and the resulting blend was extruded at 180° C. to be pelletized. A skin material was manufactured using the obtained TPU pellets according to a known injection molding method. A molded article including a core material, a pad material, and the skin material was prepared, and some of the molded article was taken as a test sample.

Comparative Example 1

22.6 parts by weight (24.15 kg) of hexamethylene diisocyanate (whose NCO/OH molar ratio was raised to 0.991) was added in the secondary mixing of Example 1, and TPU having a melt flow index of 132 g/10 min, as measured at 165 s and a load of 2.16 kg according to ISO 1133, was prepared, and injection-molded to obtain a skin material, some of which was then taken as a test sample.

Comparative Example 2

22.34 parts by weight (23.85 kg) of hexamethylene diisocyanate (whose NCO/OH molar ratio was reduced to 0.979) was added in the secondary mixing of Example 1, and TPU having a melt flow index of 298 g/10 min, as measured at 165 s and a load of 2.16 kg according to ISO 1133, was prepared, and injection-molded to obtain a skin material, some of which was then taken as a test sample.

Comparative Example 3

A TPU composition was prepared in the same manner as in Example 1, but the polydimethylsiloxane diol used in Example 1 was not mixed in Comparative Example 3. Then, the TPU composition was injection-molded to obtain a skin material, some of which was then taken as a test sample.

Comparative Example 4

A TPU composition was prepared in the same manner as in Example 1, except that Luwax E powder was blended instead of the polydimethylsiloxane diol used in Example 1. Then, the TPU composition was injection-molded to obtain a skin material, some of which was then taken as a test sample. Here, the Luwax E powder is a wax (commercially available from Clariant Korea Ltd.) which includes an ester of montanic acids with multifunctional alcohols as a product component.

Comparative Example 5

A TPU composition was prepared in the same manner as in Example 1, except that 60.9 parts by weight (63.3 kg) of the ether-containing polyester polyol, 10.6 parts by weight (11 kg) of the 1,4-butylene glycol, and 26.5 parts by weight (27.5 kg) of the 1,6-hexamethylene diisocyanate, all of which were used in Example 1, were primarily mixed, but the polydimethylsiloxane was not added thereto. Then, the TPU composition was injection-molded to obtain a skin material, some of which was then taken as a test sample. Here, TPU having raised hardness was used in Comparative Example 5. Raising the hardness refers to decrease in content of an ether-containing polyester polyol in a long chain as a component of a soft segment, and increase in contents of glycol 1,4-butylene glycol and isocyanate (i.e., 1,6-hexamethylene diisocyanate) in a short chain as a component of a hard segment. Here, as TPU possesses hard characteristics, an additional experiment was performed in this Comparative Example to confirm whether TPU was effective in improving process workability and enhancing scratch and wear resistance of a final molded article upon injection molding.

Comparative Example 6

A TPU composition was prepared from the same components as in Example 1. Then, the TPU composition was injection-molded using a PSM molding technique instead of the injection molding to obtain a skin material, some of which was then taken as a test sample.

Comparative Example 7

A TPU composition was prepared from the same components and in the same manner as in Example 1, except that a polydimethylsiloxane diol having a hydroxyl value of 10 mgKOH/g was used instead of the polydimethylsiloxane diol having a hydroxyl value of 22.44 mgKOH/g used in Example 1. Then, the TPU composition was processed by an injection molding technique to obtain a skin material, some of which was then taken as a test sample.

Comparative Example 8

A TPU composition was prepared from the same components and in the same manner as in Example 1, except that a polydimethylsiloxane diol having a hydroxyl value of 250 mgKOH/g was used instead of the polydimethylsiloxane diol having a hydroxyl value of 22.44 mgKOH/g used in Example 1. Then, the TPU composition was processed by an injection technique to obtain a skin material, some of which was then taken as a test sample.

TEST EXAMPLES

Test Example 1

The TPU compositions prepared in Example 1 and Comparative Examples 1 to 5 were injection-molded, and apparent mechanical properties of the TPU compositions were evaluated, as follows. Each of the mechanical properties of the TPU compositions was classified into classes 5 to 1 (1 is the worst and 5 is the best) and represented in Table 2 and 3. Here, a clamping force of an injection molding machine was 3,000 tones, and a size of an injection-molded part was 1,500 mm×500 mm×1 mm (length×width×thickness). A total of 9 injection mold gates were present as film gates. The injection mold gates were coupled through hot runner valve nozzles to which a delay sequence is applicable. Process conditions for injection molding, that is, conditions optimized so that an appearance of a molded article was most favorably molded, are listed in the following Table 1.

TABLE 1

| Items | Units | Example 1 | Comparative Examples | | | | |
| --- | --- | --- | --- | --- | --- | --- | --- |
| | | | 1 | 2 | 3 | 4 | 5 |
| Nozzle temperature | °C. | 180 | 180 | 180 | 180 | 180 | 180 |
| Cylinder temperature | °C. | 180 | 180 | 180 | 180 | 180 | 180 |
| Max injection pressure | MPa | 45 | 65 | 30 | 47 | 48 | 48 |
| Injection time | Sec | 2.7 | 2.7 | 2.7 | 2.7 | 2.7 | 2.7 |
| Cooling time | Sec | 50 | 50 | 50 | 50 | 50 | 50 |
| Mold temperature | °C. | 40 | 40 | 40 | 40 | 40 | 40 |

[Evaluation of Physical Properties]

Specific gravity was measured by an underwater substitution method according to a method specified in ASTM D 792, and hardness was measured using a Shore A hardness testing machine according to standards of ASTM D 2240. Tensile strength was measured using a measuring machine (commercially available from Instron Co., Ltd.) according to standards of ASTM D 412, a load was 5 kN, a specimen was a dumbbell #3 sample, and a tensile viscosity was set to 200 m/min.

The obtained skin materials were evaluated for anti-scratch properties. Scratch resistance was measured by observing a skin appearance of a scratch tip prepared according to SUS 403 when the scratch tip was scratched once after a balance weight of 300 g was put on the scratch tip. Evaluation results of the skin appearance were divided into five grades according to the extent of scratches formed on the skin, ranging from grade 1 in which the skin is severely damaged to grade 5 in which no skin damage is observed.

The obtained skin materials were evaluated for long-term durability (heat-aging resistance and photoaging resistance). Heat-aging resistance was evaluated by performing aging at 120 resistance) ours in a thermohygrostat, and then measuring color difference using a known colorimeter. Photoaging resistance was evaluated by observing changes in gloss and color of test samples using an accelerated photo resistance testing machine, Atlas CI 4000 Xenon Arc Weather-O-meter. Here, a specimen was tested a total of a surface free energy of 126 MJ/m$^2$ under the test conditions as follows: a wavelength range of 300 to 400 nm, an optical intensity of 70 W/m$^2$, and a surface temperature of 89° C.

The obtained skin materials were evaluated for moisture-aging resistance. Moisture-aging resistance was measured using a thermohygrostat by keeping the skin materials under conditions of a temperature of 50±5° C. and a relative humidity of 95±3% for 7 days and comparing appearances of the skin materials. Here, blooming refers to a whitening situation occurring when some of an additive or internal material migrates to a skin layer, or a change in appearance caused when foreign substances are laminated on a surface of the skin layer.

The obtained skin materials were evaluated as to wear resistance. Measurement of wear resistance was performed using a Taber wear test specified according to ASTM D 4060. An abrasive wheel used was H18, a load was 1 kg, previous abrasion was performed 100 times, and a rotary speed was 60 rpm.

TABLE 2

| Items | Units | Example 1 | Comparative Examples | | | | |
|---|---|---|---|---|---|---|---|
| | | | 1 | 2 | 3 | 4 | 5 |
| Appearance and workability of injection-molded articles | Filling rate (Class) | 5 | 4 (partially short-molded) | 5 | 4 | 5 | 5 |
| | Gas flow mark (Class) | 5 | 5 | 4 | 5 | 4 | 5 |
| | Weld line (Class) | 5 | 4 | 3 | 5 | 5 | 4 (partially formed) |
| | Sink mark (Class) | 5 | 5 | 5 | 5 | 4 | 5 |
| | Mold releasability | 5 | 4 | 4 | 2 | 3 | 3 |
| | Others | — | — | — | — | — | Hard molded articles |

TABLE 3

| Items | Units | Example 1 | Comparative Examples | | | | |
|---|---|---|---|---|---|---|---|
| | | | 1 | 2 | 3 | 4 | 5 |
| Specific gravity (ASTM D 792) | — | 1.13 | 1.13 | 1.13 | 1.13 | 1.13 | 1.13 |
| Hardness (ASTM D 2240) | Shore A | 78 | 78 | 78 | 78 | 78 | 84 |
| Tensile strength (ASTM D 412) | kgf/cm$^2$ | 121 | 121 | 82 | 102 | 105 | 135 |
| Scratch resistance | Class | 5 | 4 | 3 | 3 | 3 | 3 |
| Heat-aging resistance | Change in gloss (%) | 20 | 25 | 25 | 20 | 30 | 28 |
| | ΔE | 0.30 | 0.30 | 0.44 | 0.35 | 0.38 | 0.37 |
| Photoaging resistance | Change in gloss (%) | 20 | 22 | 20 | 28 | 28 | 28 |
| | ΔE | 0.75 | 0.75 | 0.80 | 0.65 | 0.70 | 0.68 |
| Moisture-aging resistance | Change in appearance (with the naked eye) | None | None | None | None | Bloomed | None |
| Wear resistance (ASTM D 4060) | Mg (weight loss) | 20 | 30 | 45 | 160 | 155 | 150 |

Based on the results as listed in Tables 2 and 3, change in moldability caused by the difference in melt flow index was compared in the case of Comparative Examples 1 and 2, in which the skin materials had a melt flow index of 132 g/10 min and 298 g/10 min, respectively. As a result, it was revealed that short molding occurred even under the optimized injection molding conditions since a fill rate was reduced due to low flowability in the case of Comparative Example 1. In addition, it was revealed that injection moldability and appearance of the skin material of the molded article were good due to high flowability, but a tensile strength of the skin material was lowered by approximately 20% in the case of Comparative Example 2.

In addition, it was revealed that the mold releasability of the skin material was remarkably degraded upon injection molding due to the absence of polydimethylsiloxane diol in the case of Comparative Example 3 in which the polydimethylsiloxane diol was not added, and also that the scratch resistance of the skin material was class 3, which was relatively lower than that of the skin material in Example 1, and the wear resistance was remarkably low.

Additionally, it was revealed that the mold releasability of the skin material was slightly lowered, and the scratch resistance of the skin material was class 3 in the case of Comparative Example 4 in which the Luwax E powder was used instead of the polydimethylsiloxane diol. In addition, it was revealed that appearance of the skin material was not good due to the occurrence of blooming, and the wear resistance of the skin material was remarkably degraded.

Further, it was revealed that, when the hardness of the TPU base resin was raised to approximately Shore 6A without using the polydimethylsiloxane diol, the mold releasability of the skin material was slightly lowered, the scratch resistance of the skin material was low with class 3, and the wear resistance of the skin material was remarkably degraded. In addition, it was revealed that the molded article formed of the skin material is hardened due to high hardness, resulting in degraded emotional qualities.

On the other hand, it was revealed that the skin material of Example 1 had the best appearance when molded by an injection technique using a C/pad IP skin material, compared to the skin materials of Comparative Examples 1 to 5, and showed good injection workability including mold releasability. In addition, it was revealed that the skin material had excellent tactile sensation due to low hardness, and all the other physical properties of the skin material were excellent and met standard requirements for vehicles. Additionally, it was revealed that the scratch resistance of the skin material was class 5, and thus the skin material was directly metallized. Here, since instrument panels of vehicles are generally exposed to a relatively higher amount of sunlight than other parts of the vehicles, polymers may be degraded. Thus, heat-aging and photoaging resistance are especially important evaluation items.

Test Example 2

Skin materials were prepared using the TPU compositions having different melt flow indexes prepared in Example 1 and Comparative Example 6, and thicknesses of the skin materials were compared. Results are listed in the following Table 4.

TABLE 4

| Items | Test number | Example 1 | Comparative Example 6 |
|---|---|---|---|
| Thickness (mm) | 1 | 0.98 | 1.10 |
| | 2 | 0.99 | 1.05 |
| | 3 | 0.99 | 1.00 |
| | 4 | 0.97 | 1.20 |
| | 5 | 0.98 | 1.10 |
| | Average | 0.98 | 1.09 |

Based on the results listed in Table 4, it was revealed that the skin material of Example 1 was thin and uniform in thickness, compared to that of Comparative Example 6. As a result, it could be seen that the skin material of Example 1 was effective in manufacturing lightweight vehicles, saving costs due to decrease in weight of the vehicles, and reducing waste. In addition, it was revealed that the skin material of Example 1 was effective in improving aesthetics since pinholes were not formed, and reducing a defect rate caused by leakage of a foam solution in a manufacturing process, compared to the skin material of Comparative Example 6 which was formed using a PSM technique.

Test Example 3

A core material and a pad material were bound to the skin material obtained by injection-molding the TPU composition prepared in Example 1 to obtain a C/pad cockpit module. Thereafter, the C/pad cockpit module was tested for airbag deployment performance under the conditions listed in the following Table 5 (according to performance tests specified by Hyundai Motor Co., Ltd. and Kia Motors Corporation). Results are listed in the following Table 6.

TABLE 5

| Items | Deployment test (base line) | Environmental exposure test (heat resistance cycle) | Heat-aging test |
|---|---|---|---|
| Test procedure | — | −35° C. (6H) → 21° C., 95% (6H) → 71° C., 75% (6H) → 105° C. (6H) = one cycle (a total of 14 cycles) 1$^{st}$ cycle = temperature, moisture, and vibration (in one machine), and 14$^{th}$ cycle = temperature, and moisture | Kept at 105° C. for 400 hours, and then kept at 21° C. for 8 hours |
| Exposure conditions | | Kept at low temperature of −35° C. (−30° C.), a room temperature of 21° C., and a high temperature of 85° C. for 4 hours, and then kept within 3 minutes | |

TABLE 6

| Items | Tests | Example 1 |
|---|---|---|
| Airbag deployment performance | Deployment test (baseline) | Normal deployment |
| | Environmental exposure test (heat resistance cycle) | Normal deployment |
| | Heat-aging test | Normal deployment |

Based on the results listed in Table 6, it was revealed that all air bags were normally deployed in the deployment test, the environmental exposure test, and the heat-aging test, all of which were used to evaluate airbag deployment performance. As a result, it could be seen that crash pads showed good airbag deployment performance when a final molded article including the TPU composition was applied to crash pads.

Test Example 4

An anti-fogging test specified by Hyundai Motor Co., Ltd. and Kia Motors Corporation was performed on the skin materials obtained by injection-molding the TPU composition prepared in Example 1. The anti-fogging test was performed by keeping 5 g of a skin material at a temperature of 100° C. for 5 hours, and measuring a haze of glass whose top portion was sealed and held. Here, HAZE-GARDII commercially available from Toyoseiki was used as a hazemeter.

TABLE 7

| Items | Test No. | Example 1 |
|---|---|---|
| Anti-fogging test | 1 | 0.38 |
| | 2 | 0.55 |
| | 3 | 0.78 |
| | Average | 0.57 |

Based on the results listed in Table 7, it could be seen that the molded article prepared in Example 1 showed good anti-fogging property since an average of values obtained by performing an anti-fogging test in triplicate, and the highest value was evaluated to be lower than an upper limit of general vehicle baseline (Hyundai Motor MS base line of 3 or less) when the anti-fogging test was performed on the molded article. As a result, it was revealed that the molded article prepared in Example 1 had good anti-fogging property.

Test Example 5

The skin materials obtained by injection-molding the TPU compositions prepared in Example 1 and Comparative Examples 7 and 8 were evaluated for scratch resistance and wear resistance. Results are listed in the following Table 8.

TABLE 8

| Items | Units | Example 1 | Comparative Example 7 | Comparative Example 8 |
|---|---|---|---|---|
| Scratch resistance | Class | 5 | 4 | 3 |
| Wear resistance (ASTM D 4060) | Mg (weight loss) | 20 | 29 | 35 |
| Wear resistance (ASTM D 4060) (specimen kept at room temperature for 120 day and measured) | Mg (weight loss) | 21 | 38 | 44 |
| Other remarks | — | — | Polydimethylsiloxane diol converging on surface of polymerized product | — |

Based on the result listed in Table 8, it could be seen that convergence of the additive on a surface of the polymerized product occurred, and wear resistance was degraded in the case of Comparative Example 7 in which a hydroxyl value of the polydimethylsiloxane diol was out of the range from 11 to 248 mgKOH/g. In addition, it was confirmed that scratch resistance and wear resistance of the skin material of Comparative Example 8 were degraded when the skin material was applied. On the other hand, it was confirmed that scratch resistance and wear resistance of the skin material of Example 1 met the desired standard requirements.

Therefore, it could be seen that the TPU composition prepared in Example 1 was easily injection-molded since a slip property was imparted to a soft segment due to the presence of chemical bonds in polyurethane molecules, and possessed excellent molded article qualities such as tactile sensation and embossing quality, durability properties such as heat-aging resistance, photoaging resistance, and wear resistance, and stability properties such as airbag deployment performance and anti-fogging property when a chain extender and a multifunctional polydimethylsiloxane-based compound were mixed with an isocyanate- and ether-containing polyester polyol.

The thermoplastic polyurethane composition according to one embodiment of the present invention can be easily injection-molded since a slip property is imparted to a soft segment due to the presence of chemical bonds in polyurethane molecules, and can possess excellent molded article qualities such as tactile sensation and embossing quality, durability properties such as heat-aging resistance, photoaging resistance, and wear resistance, and stability properties such as airbag deployment performance and anti-fogging property when a chain extender and a multifunctional polydimethylsiloxane-based compound are mixed with an isocyanate- and ether-containing polyester polyol.

In addition, the molded article formed of the thermoplastic polyurethane composition may have an equivalent level of performance and excellent aesthetics even when the molded article is manufactured by an injection technique, compared to skin materials prepared by conventional techniques. Particularly, the molded article can be useful in simplifying processes, reducing manufacturing costs, and simplifying facilities due to a decrease in the number of parts since a process of preparing a powder is not required when compared to a conventional PSM technique.

Further, since the thermoplastic polyurethane composition is formed into molded articles with a thin and uniform thickness in a molding technique, the thermoplastic polyurethane composition can be useful in contributing to improvement of fuel efficiency due to decrease in weight of the molded articles, and also has cost-saving and waste reduction effects since the least pieces of the molded articles remain.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing a skin material for interior parts of a vehicle, comprising:
    manufacturing a thermoplastic polyurethane-forming composition having a melt flow index of from about 200 to about 250 g/10 min (at 165° C. and 2.16 kg), wherein the thermoplastic polyurethane-forming composition comprises:
    about 15 to about 60 parts by weight of an isocyanate compound,
    about 30 to about 70 parts by weight of an ether-containing polyester polyol;
    about 5 to about 40 parts by weight of a chain extender, and
    about 0.1 to about 5 parts by weight of a multifunctional polydimethylsiloxane-based compound; and
    manufacturing the skin material for the interior parts of the vehicle using the thermoplastic polyurethane-forming composition according to injection molding method.

2. The method of manufacturing the skin material for the interior parts of the vehicle of claim 1, wherein the isocyanate compound comprises at least one selected from the group consisting of diphenylmethane diisocyanate (MDI), toluene diisocyanate (TDI), hexamethylene diisocyanate (HDI), dicyclohexylmethane diisocyanate (H12MDI), and isophorone diisocyanate (IPDI).

3. The method of manufacturing the skin material for the interior parts of the vehicle of claim 1, wherein the isocyanate compound has an NCO/OH molar ratio of from about 0.98 to about 0.99.

4. The method of manufacturing the skin material for the interior parts of the vehicle of claim 1, wherein the ether-containing polyester polyol is prepared from a multifunctional carboxylic acid compound, a multifunctional alcohol compound, and poly(tetramethylene ether) glycol (PTMG).

5. The method of manufacturing the skin material for the interior parts of the vehicle of claim 4, wherein the multifunctional carboxylic acid compound comprises at least one selected from the group consisting of adipic acid, suberic acid, abelic acid, azelaic acid, sebacic acid, dodecanedioic acid, and tricarboxylic acid.

6. The method of manufacturing the skin material for the interior parts of the vehicle of claim 4, wherein the multi-functional alcohol compound comprises at least one selected from the group consisting of 1,4-butylene glycol, ethylene glycol, butanediol, hexanediol, and trimethylolpropane.

7. The method of manufacturing the skin material for the interior parts of the vehicle of claim 4, wherein the poly(tetramethylene ether) glycol (PTMG) has a hydroxyl value of from about 50 to about 600 mg KOH/g.

8. The method of manufacturing the skin material for the interior parts of the vehicle of claim 1, wherein the ether-containing polyester polyol has a hydroxyl value of from about 1 to about 250 mgKOH/g.

9. The method of manufacturing the skin material for the interior parts of the vehicle of claim 1, wherein the chain extender comprises at least one selected from the group consisting of 1,4-butylene glycol, ethylene glycol, diethylene glycol, butanediol, hexanediol, trimethylolpropane, and poly(tetramethylene ether) glycol.

10. The method of manufacturing the skin material for the interior parts of the vehicle of claim 1, wherein the multi-functional polydimethylsiloxane-based compound is a compound represented by the following Formula 1:

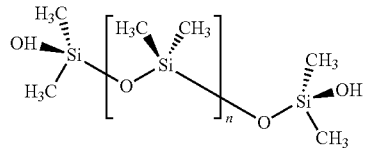

[Formula 1]

wherein n is an integer ranging from about 4 to about 138.

11. The method of manufacturing the skin material for the interior parts of the vehicle of claim 1, wherein the multi-functional polydimethylsiloxane-based compound has a hydroxyl value of from about 11 to about 248 mg KOH/g.

12. The method of manufacturing the skin material for the interior parts of the vehicle of claim 1, further comprising from about 0.1 to about 5 parts by weight of a photostabilizer, and from about 0.1 to about 2 parts by weight of a pigment, based on 100 parts by weight of the thermoplastic polyurethane composition for injection molding.

* * * * *